United States Patent
Ide et al.

(10) Patent No.: US 6,812,969 B2
(45) Date of Patent: Nov. 2, 2004

(54) DIGITAL CAMERA

(75) Inventors: Eiichi Ide, Itami (JP); Mutsuhiro Yamanaka, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/355,255

(22) Filed: Jan. 31, 2003

(65) Prior Publication Data
US 2003/0174230 A1 Sep. 18, 2003

(30) Foreign Application Priority Data
Jan. 31, 2002 (JP) ..................................... P2002-023198

(51) Int. Cl.[7] .......................... H04N 5/222; G03B 13/00
(52) U.S. Cl. ................... 348/346; 348/345; 348/333.04
(58) Field of Search ............................. 348/333, 362, 348/333.11, 333.01, 333.02, 333.04, 333.12, 346, 345, 349, 354; 382/264, 255

(56) References Cited

U.S. PATENT DOCUMENTS

| | | | |
|---|---|---|---|
| 4,481,540 A | * 11/1984 | Bergen | 348/347 |
| 4,660,092 A | * 4/1987 | Nutting | 348/341 |
| 4,775,892 A | * 10/1988 | Surdyke | 348/345 |
| 4,794,459 A | * 12/1988 | Moberg et al. | 348/346 |
| 5,041,911 A | * 8/1991 | Moorman | 348/364 |
| 5,496,106 A | * 3/1996 | Anderson | 348/255 |
| 6,512,548 B1 | * 1/2003 | Anderson | 348/333.05 |
| 2002/0171747 A1 | * 11/2002 | Niikawa et al. | 348/333.01 |
| 2003/0002870 A1 | * 1/2003 | Baron | 396/147 |
| 2003/0011701 A1 | * 1/2003 | Nilson et al. | 348/370 |
| 2003/0117511 A1 | * 6/2003 | Belz et al. | 348/333.11 |

FOREIGN PATENT DOCUMENTS

| | | |
|---|---|---|
| JP | 2001-86385 | 3/2001 |
| JP | 2001-136429 | 5/2001 |

* cited by examiner

*Primary Examiner*—Tuan Ho
*Assistant Examiner*—Timothy J. Henn
(74) *Attorney, Agent, or Firm*—McDermott Will & Emery LLP

(57) ABSTRACT

Provided is a digital camera in which the user can easily recognize that an image is out of focus by viewing a display image. At the time of live view display, image capturing is performed every predetermined time in an image capturing unit 3 and images for live view display are successively recorded on an image memory 209. An evaluation value computing unit 230 in an overall control unit 211 obtains an image stored in the image memory 209 and calculates an evaluation value indicative of the focus state of the image. A display image control unit 240 obtains the evaluation value, determines a focus state of the image, and controls a process to be performed by a display image processing unit 250 in accordance with the result of determination. When the image is out of focus, an image quality degrading process is performed in the display image processing unit 250 and an image of low image quality is displayed on a display 10.

13 Claims, 13 Drawing Sheets

F I G. 4
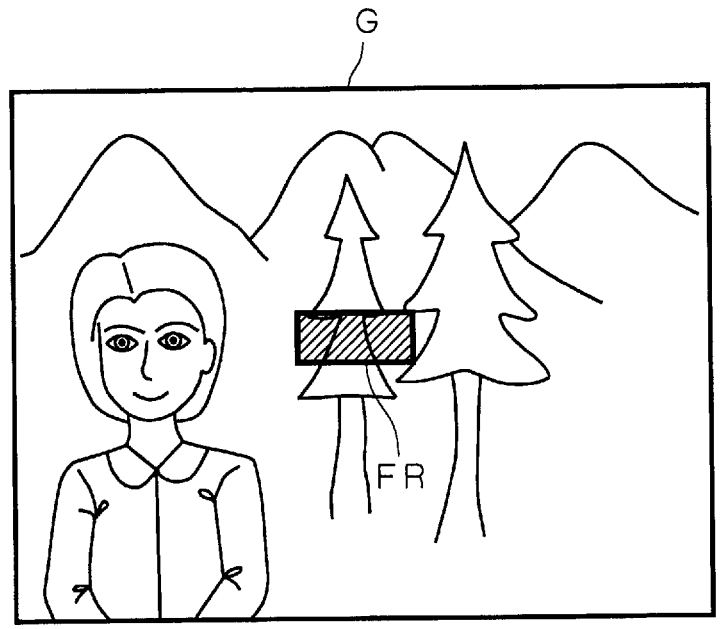
F I G. 5
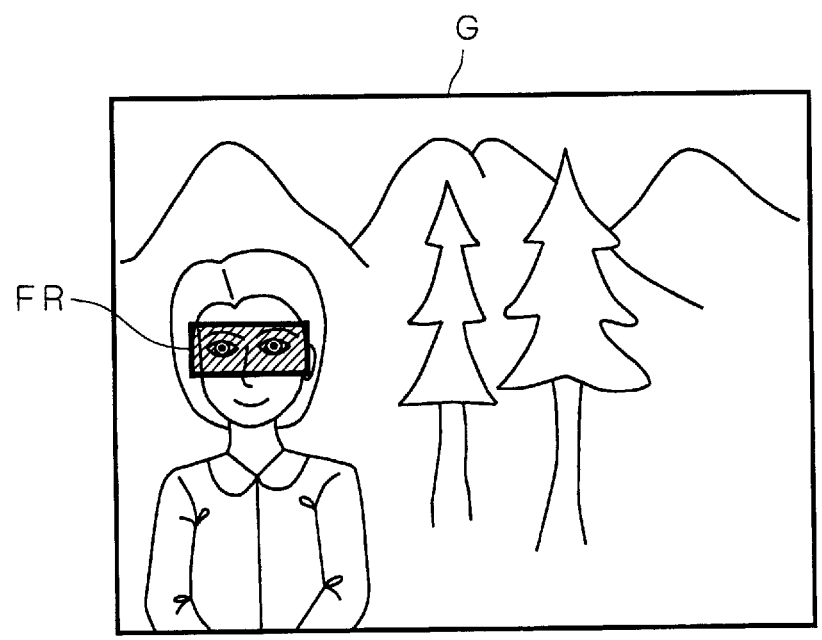

FIG. 9

| 1 | 2 | 1 |
|---|---|---|
| 2 | 4 | 2 |
| 1 | 2 | 1 |

FIG. 10

| −1 | −2 | −1 |
|---|---|---|
| −2 | 12 | −2 |
| −1 | −2 | −1 |

FIG. 11

| $Y_{i-1,j-1}$ | $Y_{i,j-1}$ | $Y_{i+1,j-1}$ |
|---|---|---|
| $Y_{i-1,j}$ | $Y_{i,j}$ | $Y_{i+1,j}$ |
| $Y_{i-1,j+1}$ | $Y_{i,j+1}$ | $Y_{i+1,j+1}$ |

F I G . 1 5
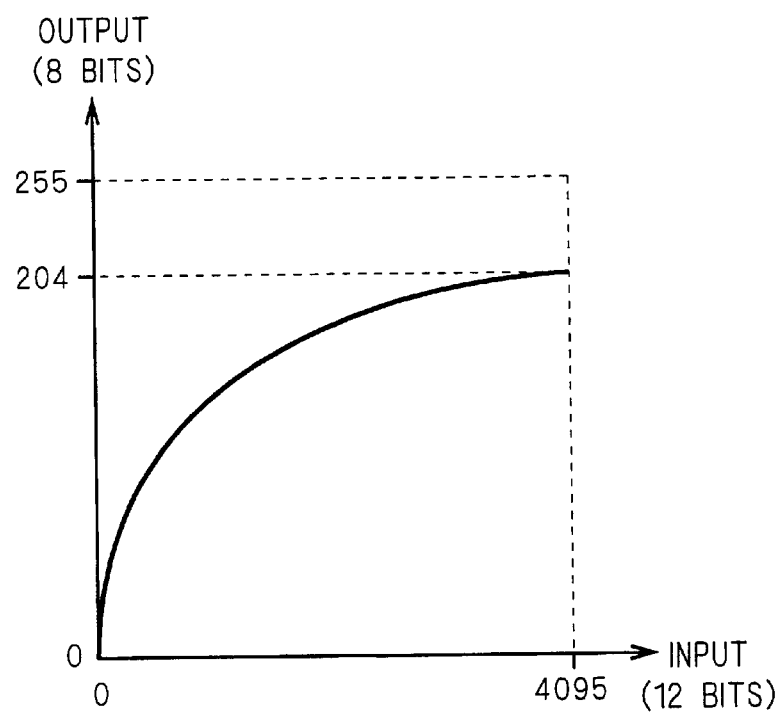

FIG. 17A

| $Y_{11}$ | $Y_{21}$ | $Y_{31}$ | $Y_{41}$ | $Y_{51}$ | $Y_{61}$ |
|---|---|---|---|---|---|
| $Y_{12}$ | $Y_{22}$ | $Y_{32}$ | $Y_{42}$ | $Y_{52}$ | $Y_{62}$ |
| $Y_{13}$ | $Y_{23}$ | $Y_{33}$ | $Y_{43}$ | $Y_{53}$ | $Y_{63}$ |
| $Y_{14}$ | $Y_{24}$ | $Y_{34}$ | $Y_{44}$ | $Y_{54}$ | $Y_{64}$ |

| $Y_{11}$ | $Y_{11}$ | $Y_{31}$ | $Y_{31}$ | $Y_{51}$ | $Y_{51}$ |
|---|---|---|---|---|---|
| $Y_{11}$ | $Y_{11}$ | $Y_{31}$ | $Y_{31}$ | $Y_{51}$ | $Y_{51}$ |
| $Y_{13}$ | $Y_{13}$ | $Y_{33}$ | $Y_{33}$ | $Y_{53}$ | $Y_{53}$ |
| $Y_{13}$ | $Y_{13}$ | $Y_{33}$ | $Y_{33}$ | $Y_{53}$ | $Y_{53}$ |

G2

DIGITAL CAMERA

This application is based on application No. 2002-023198 filed in Japan, the contents of which are hereby incorporated by reference.

BACKGROUND OF THE INVENTION

1. Field of the Invention

The present invention relates to an image processing technique of a digital camera or the like for capturing an image of a subject by using a CCD image capturing device or the like.

2. Description of the Background Art

In recent years, in order to improve the picture quality of a captured image, the number of pixels of an image capturing part such as a CCD image capturing device is being remarkably increased in a digital camera. Meanwhile, reduction in size of a digital camera as a whole, and the like is demanded so that it is difficult for a display part for displaying an image to have the number of display pixels equivalent to the number of pixels of an image capturing part. The larger the number of display pixels becomes, the slower a processing speed gets, resulting in difficulty in displaying a line view smoothly. Consequently, it is not realistic to perform a displaying process by using all of the number of pixels of the image capturing part.

Therefore, a digital camera is generally provided with the display part having the number of display pixels which is relatively small and, at the time of live view display, a process of thinning pixels of an image obtained from the image capturing part is performed and a resultant image is displayed.

In such a manner, all of pixels which are captured by the image capturing part are not displayed at the time of line view display, so that a problem arises that it is difficult to recognize a focus state by a display image.

In order to solve the problem, Japanese Patent Application Laid-Open No. 2001-86385 discloses a technique of displaying an image subjected to a peaking process (process of emphasizing high frequency components of an image more than low frequency components) when an image enters an almost in-focus state so that an in-focus state can be easily recognized by using a displayed image.

However, there is a problem such that, only by performing a peaking process when an image enters an almost in-focus state as in the technique disclosed in the publication, when the image is out-of-focus, it is difficult for the user to visually recognize that the image is blurred by defocus only by viewing a displayed image. Conventionally, in some cases, although an image is actually out-of-focus, the user who views the displayed image is not aware of the blur by defocus and operates the shutter start button to start an image-capturing operation.

Even in a state where the subject is slightly out of focus, there is the possibility that the contour is emphasized by a peaking process. Consequently, the user feels as if the image is in focus. A problem arises such that it is difficult to accurately determine a focus state only by visually recognizing a displayed image.

SUMMARY OF THE INVENTION

The present invention has been achieved in consideration of the problems and its object is to provide a technique capable of making the user easily recognize an in-focus state by a displayed image.

The present invention is directed to a digital camera.

According to an aspect of the present invention, the digital camera includes: an image capturing device for capturing an image; an evaluating part for evaluating a focus state of an image obtained by the image capturing device; an image processor, when the evaluating part determines that the image is out of focus, for performing an image quality degrading process for emphasizing the out-of-focus state on the image obtained from the image capturing device; and a display for displaying the image subjected to the image quality degrading process in the image processor when the evaluating part determines that the image is out of focus.

According to the aspect, when a focus state of an image obtained by the image capturing device is evaluated and it is determined that the image is out of focus, the image quality degrading process for emphasizing the out-of-focus state is performed on the image obtained from the image capturing device, and the image subjected to the image quality degrading process is displayed. Thus, the user sees the displayed image and can easily recognize that the image is out of focus. That is, when the image is out of focus, the image of low quality is displayed, so that the focus state can be easily recognized. As a result, when an image is out of focus, the user can be prevented from erroneously giving an image capturing instruction, so that failures in image capturing by the digital camera can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates an example of an evaluation area;

FIG. 5 illustrates a case where the evaluation area is moved to a portion of the main subject;

FIG. 9 is a diagram showing an example of a low-pass filter;

FIG. 10 is a diagram showing an example of a high-pass filter;

FIG. 11 is a diagram showing a luminance value of an image component to which a filter is applied;

FIG. 15 is a graph showing a γ table for lowering the luminance value;

FIGS. 17A and 17B are diagrams showing the concept of the mosaic process;

DESCRIPTION OF THE PREFERRED EMBODIMENTS

Hereinafter, embodiments of the present invention will be described in detail with reference to the drawings.

1. Schematic Configuration of Digital Camera

Figure 1:
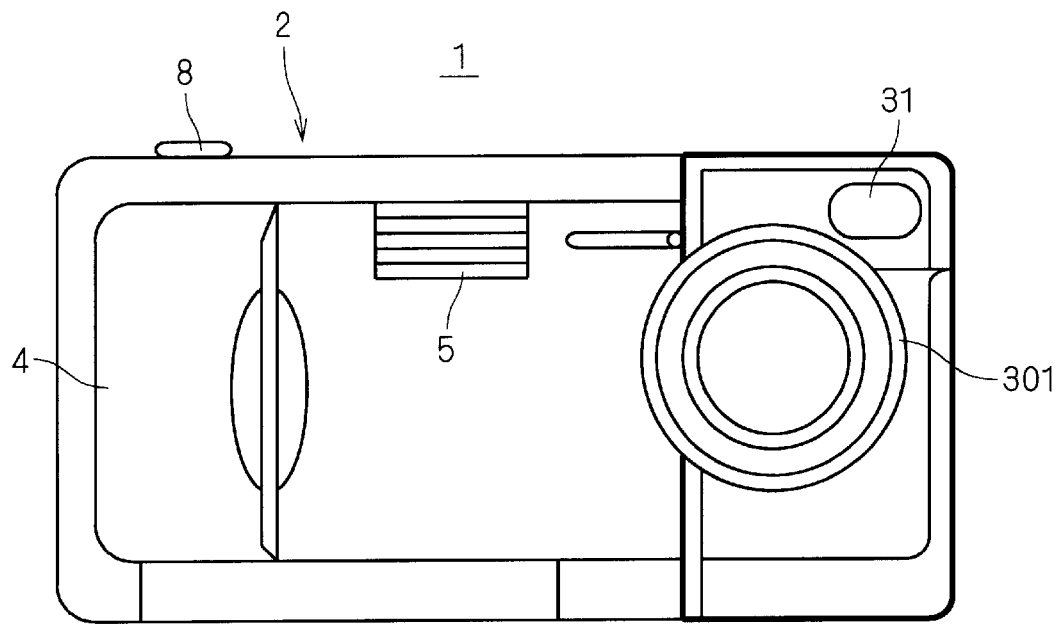
FIG. 1 is a front view showing an example of the configuration of a digital camera.
Figure 2:
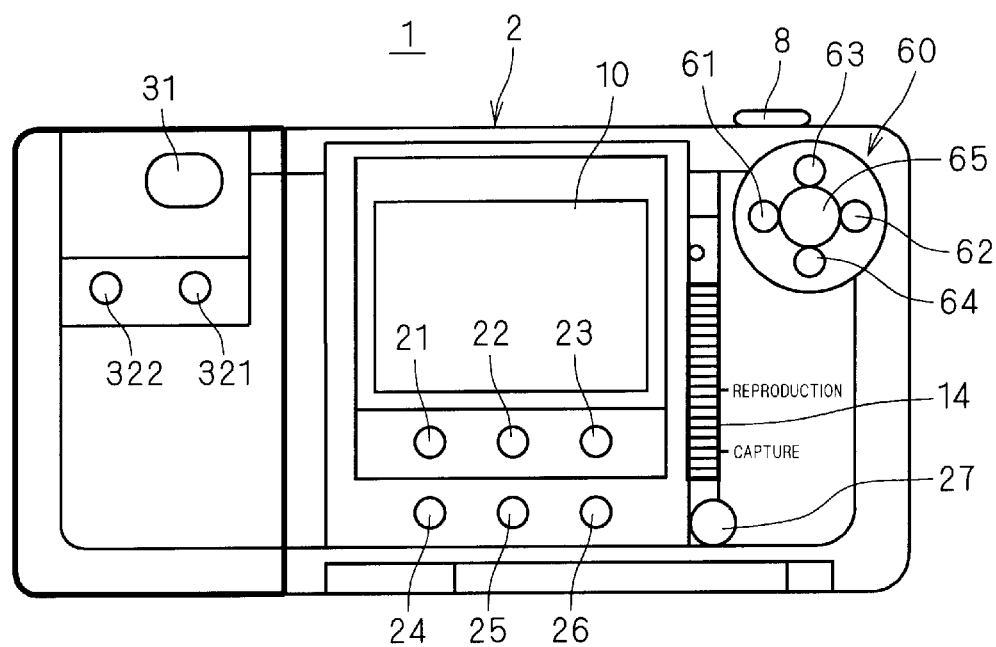
FIG. 2 is a rear view showing an example of the configuration of the digital camera.

FIGS. 1 and 2 are appearance drawings showing an example of the configuration of a digital camera 1 according to the preferred embodiment. FIG. 1 is a front view and FIG. 2 is a rear view.

The digital camera 1 is constructed by, as shown in FIG. 1, a box-shaped camera body 2 of a rectangular parallelepiped shape. On the front face side of the camera body, a taking lens 301 having a zoom function and an optical viewfinder 31 are provided. On the front face side of the camera body 2, a grip 4 is provided in the left end portion, a built-in electronic flash 5 is provided in the central upper part, and a shutter start button (hereinafter referred to as shutter button) 8 is provided on the top face side. A half depression state (herein after referred to as S1 state) and a full depression state (hereinafter referred to as S2 state) of the shutter button 8 can be discriminated. When the user fully depresses the shutter button 8, an image capturing operation for recording an image is performed in the digital camera 1.

As shown in FIG. 2, on the rear face side of the camera body 2, a display 10 such as a liquid crystal display (LCD) or the like is provided to display a live view, produce and display a recorded image and the like. The display 10 has the number of display pixels of, for example, 400×300.

Below the display 10, key switches 21 to 26 for operating the digital camera 1 and a power source switch 27 are provided. In the digital camera 1, one of the key switches 21 to 26 is assigned as a focus button (for example, the switch 21). When user depresses the focus button 21, the mode can be switched between a manual-focus mode and an auto-focus mode. In the auto-focus mode, for example, when the user depresses the shutter button 8 half way, auto-focus control is performed.

Further, on the rear face side of the camera body 2, a mode setting switch 14 for switching the mode between an "image capturing mode" and a "reproduction mode" is provided. The image capturing mode is a mode of taking a digital picture and generating an image of a subject, and the reproduction mode is a mode of reading the image recorded on a memory card and reproducing and displaying the image onto the display 10. The mode setting switch 14 is a slide switch of two positions. When the mode setting switch 14 is slid and set to the lower position, the image capturing mode functions. When the mode setting switch 14 is slid and set to the upper position, the reproduction mode functions.

In the right part of the camera rear face, a four-way switch 60 is provided. In the image capturing mode, by depressing either a left button 61 or a right button 62, the zooming ratio is changed. By depressing an upper button 63 or a lower button 64, a focusing lens unit in the taking lens 301 can be driven when the manual-focus mode is set. In the manual-focus mode, the digital camera 1 performs a focus control according to manual operation by driving the taking lens 301 by a motor during the operation of the button 63 or 64. Alternately, the user can directly operate the taking lens 301 to perform the focus control.

Further, the user can freely set an evaluation area for evaluating a focus state by depressing a center button 65 provided in the center of the four-way switch 60. In the display 10, an image corresponding to the evaluation area is displayed so as to be superimposed on a live view display. According to the operation on the buttons 61 to 64 by the user, the evaluation area can be moved to an arbitrary position in a screen. Therefore, the four-way switch 60 also functions as an evaluation area designation button.

On the rear face side of the camera body, as shown in FIG. 2, a display button 321 for turning on/off the display 10 and a macro button 322 are provided. When the display button 321 is depressed, the on/off state of the display 10 is switched. For example, when the display 10 is set to the on state in the image capturing mode, a live view is displayed on the display 10. By the live view display, the user can easily perform framing of the camera, or the like. At the time of macro (close-up) photographing, by depressing the macro button 322, macro photographing can be performed.

In the bottom part of the camera body 2, a card slot is provided, into which a detachable memory card (recording medium) for recording an exposed image or the like is inserted.

Figure 3:
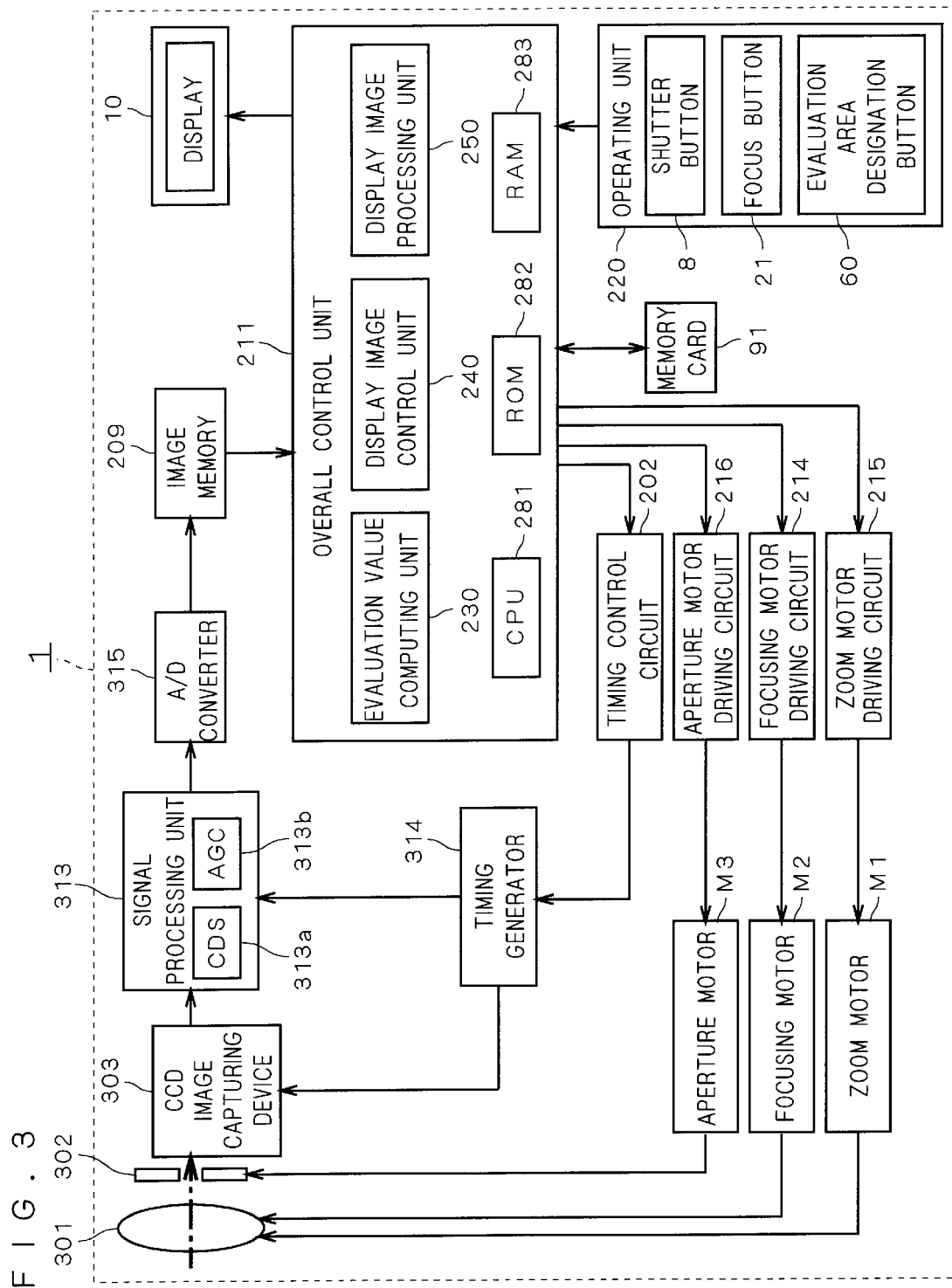
FIG. 3 is a block diagram showing the functional configuration of the digital camera.

The internal configuration of the digital camera 1 will now be described. FIG. 3 is a block diagram showing a functional configuration of the digital camera 1.

In an appropriate rear position of the taking lens 301 in the camera body 2, an image capturing circuit having a CCD image capturing device 303 (hereinafter referred to as CCD) is provided. The camera body 2 has therein a zoom motor M1 for changing the zoom ratio of the taking lens 301 and moving the lens between a housing position and an image-taking position, a focusing motor M2 for performing focus control by driving the taking lens 301, and an aperture motor M3 for adjusting the opening diameter of an aperture diaphragm 302 provided in the taking lens 301. The zoom motor M1, the focusing motor M2 and the aperture motor M3 are driven by a zoom motor driving circuit 215, a focusing motor driving circuit 214 and an aperture motor driving circuit 216, respectively, provided in the camera body 2. The driving circuits 214 to 216 drive the motors M1 to M3, respectively, on the basis of control signals supplied from an overall control unit 211.

The CCD 303 has a configuration in which a plurality of pixels (for example, 1600×1200 pixels) are arranged in a plane. Each pixel outputs a pixel signal corresponding to each of color components R (red), G (green) and B (blue) according to a Bayer pattern. The CCD 303 photoelectrically converts an optical image of a subject formed by the taking lens 301 into image signals (signals of a signal train of pixels signals received by the pixels) of the color components of R (red), G (green) and B (blue).

Exposure control is performed by adjusting the aperture diaphragm 302 and the exposure amount of the CCD 303, that is, charge accumulation time of the CCD 303 corresponding to the shutter speed.

A timing generator 314 generates a drive control signal of the CCD 303 on the basis of reference clocks transmitted from a timing control circuit 202. The timing generator 314 generates, for example, clock signals such as an integration start/end (exposure start/end) timing signal and read control signals (horizontal sync signal, vertical sync signal, transfer signal and the like) of photosensing signals of pixels, and outputs the clock signals to the CCD 303.

The signal processing unit 313 performs a predetermined analog signal process on an image signal (analog signal)

outputted from the CCD 303. The signal processing unit 313 has a CDS (Correlated Double Sampling) circuit 313a and an AGC (Auto Gain Control) circuit 313b, reduces noise of the image signal by the CDS circuit 313a, and adjusts the gain by the AGC circuit 313b, thereby adjusting the level of the image signal.

An A/D converter 315 converts each of pixel signals constructing the image signal into a digital signal of, for example, 12 bits. Consequently, the image signal is converted to a digital signal by the A/D converter 315 and each pixel indicative of a color component according to the Bayer pattern has a tone of 12 bits.

That is, the CCD 303, signal processing unit 313, and A/D converter 315 function as an image capturing function part for taking a picture of an image and are constructed so as to output an image signal. In the image capturing function part, an image-capturing operation can be performed by using all of the pixels (1600×1200) of the CCD 303 at the time of image capturing for recording. At the time of live view display, an image signal of the number of pixels corresponding the number of display pixels (400×300) of the display 10 is generated in the image capturing function part and is outputted.

The timing control circuit 202 is constructed to generate a reference clock and a clock to the timing generator 314. The timing control circuit 202 is controlled by the overall control unit 211.

An image memory 209 is a memory for temporarily storing an image signal outputted from the A/D converter 315. Since image signals of pixel arrangement corresponding to the Bayer pattern and consisting of pixels each having a color component value corresponding to one of R, G or B are inputted, the image memory 209 stores the image signals. The image memory 209 has a storage capacity for storing at least one frame of image signals which are inputted in the image capturing operation for taking a recording image. Consequently, image signals of more than one frame, which are inputted at the time of live view display operation, can be stored in the image memory 209.

In the capturing standby state in the image capturing mode, if the display 10 is in the ON state, a live view is displayed on the display 10. At this time, a predetermined image process is performed by the overall control unit 211 on each of images captured by the CCD at predetermined intervals and stored into the image memory 209 and the processed images are supplied to the display 10, thereby realizing the live view display. By the live view display, the user can easily perform framing operation or the like before the operation of depressing the shutter button 8.

After the shutter button 8 is fully depressed by the user, a capturing instruction is given to the overall control unit 211. The image capturing operation for taking a recording image is performed, a captured image of high resolution is generated and stored into the image memory 209, and subjected to a predetermined image process in the overall control unit 211. After that, the processed captured image is recorded in a memory card 91 as a kind of the recording medium.

In the reproduction mode, a predetermined signal process is performed on an image read from the memory card 91 by the overall control unit 211. After that, the processed image is transferred to the display 10 and reproduced and displayed on the display 10.

An operating portion 220 includes the various switches and buttons including the shutter button 8, a focus button 21 and the evaluation area designation button 60. Information inputted by the user is transmitted to the overall control unit 211 via the operating portion 220.

The overall control unit 211 functions as a control part for performing centralized control on the image capturing operation of the digital camera 1 by controlling operations of members in a functional manner and is constructed as an integrated circuit unit having therein a CPU (Central Processing Unit) 281, a ROM (Read Only Memory) 282, a RAM (Random Access Memory) 283, an evaluation value computing unit 230, a display image control unit 240 and a display image processing unit 250.

The CPU 281 reads out a program stored in the ROM 282 and executes it, thereby performing centralized control on live view display operation and image capturing operation in the image capturing mode, the image reproducing process in the reproduction mode, and the like while using the RAM 283 as a temporary memory at the time of the program executing process.

The evaluation value computing unit 230, display image control unit 240, and display image processing unit 250 are main components for performing the live view display in the digital camera 1. An image signal stored in the image memory 209 is inputted at the time of live view display, predetermined image process is performed and, after that, the image signal is outputted to the display 10, thereby performing the live view display.

The evaluation value computing unit 230 calculates an evaluation value for evaluating the focus state of an image on the basis of a captured image. At this time, the evaluation value computing unit 230 performs evaluation value computation on the basis of an image component included in the evaluation area designated by the CPU 281.

FIG. 4 illustrates an example of an evaluation area FR. As shown in FIG. 4, when the user does not operate the evaluation area designation button 60, the evaluation area FR is set almost in the center portion of a screen G as a default setting.

When the main subject such as a human does not exist in the center of the screen as shown in FIG. 4, even if the in-focus state is evaluated with respect to the evaluation area FR in the center of the screen, it does not mean that the focus state of the main subject is evaluated. In such a case, therefore, the user operates the evaluation area designation button 60 to move the evaluation area FR in the screen G, thereby making the position of the main subject and the position of the evaluation area FR coincide with each other in the screen.

FIG. 5 illustrates a case where the evaluation area FR is moved to the portion of the main subject. When the evaluation area designation button 60 is operated, the CPU 281 displays the evaluation area FR on the display 10 performing the live view display, and moves the display position of the evaluation area FR in the screen G in accordance with the operation. When there is an input of determining the position of the evaluation area FR, the CPU 281 returns the display state in the display unit 10 to the normal live view display and supplies information regarding the determined evaluation area FR to the evaluation value computing unit 230.

The evaluation value computing unit 230 extracts an image component included in the evaluation area FR designated by the CPU 281 and calculates an evaluation value for evaluating the focus state of the image component. That is, the user operates the evaluation area designation button 60 to make the main subject and the evaluation area FR coincide with each other, thereby enabling the focus state of the main subject to be evaluated.

Figure 6:
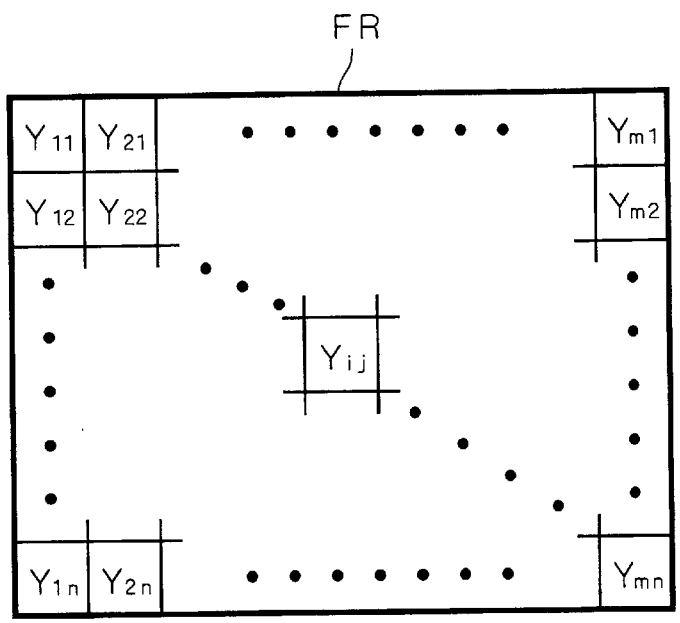
FIG. 6 is a diagram showing luminance values of pixels included in the evaluation area.

As the evaluation value for evaluating the focus state, the evaluation value computing unit 230 computes contrast C on the basis of a luminance value Y of each of pixels included in the evaluation area FR. FIG. 6 is a diagram showing the luminance values of pixels included in the evaluation area FR. As shown in FIG. 6, when it is assumed that total m×n pixels of m pixels in the horizontal direction and n pixels in the vertical direction are included in the evaluation area FR, the evaluation value computing unit 230 computes the contrast C by the following equation and uses it as an evaluation value for evaluating the focus state of the image component included in the evaluation area FR.

$$C = \sum_{i=1}^{m-1} \sum_{j=1}^{n} |Yij - Y(i+1)j|$$  Equation 1

In Equation 1, "i" denotes a parameter indicative of the position of an arbitrary pixel in the horizontal direction and is an arbitrary integer satisfying the relation of $1 \leq i \leq m$. "j" denotes a parameter indicative of the position of an arbitrary pixel in the vertical direction and is an arbitrary integer satisfying the relation of $1 \leq j \leq n$. Yij indicates the luminance value of a corresponding pixel.

That is, the evaluation value computing unit 230 computes the absolute value of the difference of the luminance values between neighboring pixels included in the evaluation area FR, and a sum of the difference values with respect to the evaluation area FR becomes the evaluation value C. The evaluation value computing unit 230 computes the evaluation value C from an image stored in the image memory 209 at the time of live view display operation and supplies the evaluation value C to the display image control unit 240.

In the display image control unit 240, by comparing the evaluation value C computed by the evaluation value computing unit 230 with a predetermined threshold TH, the focus state of the image component included in the evaluation area FR is evaluated.

Figure 7:
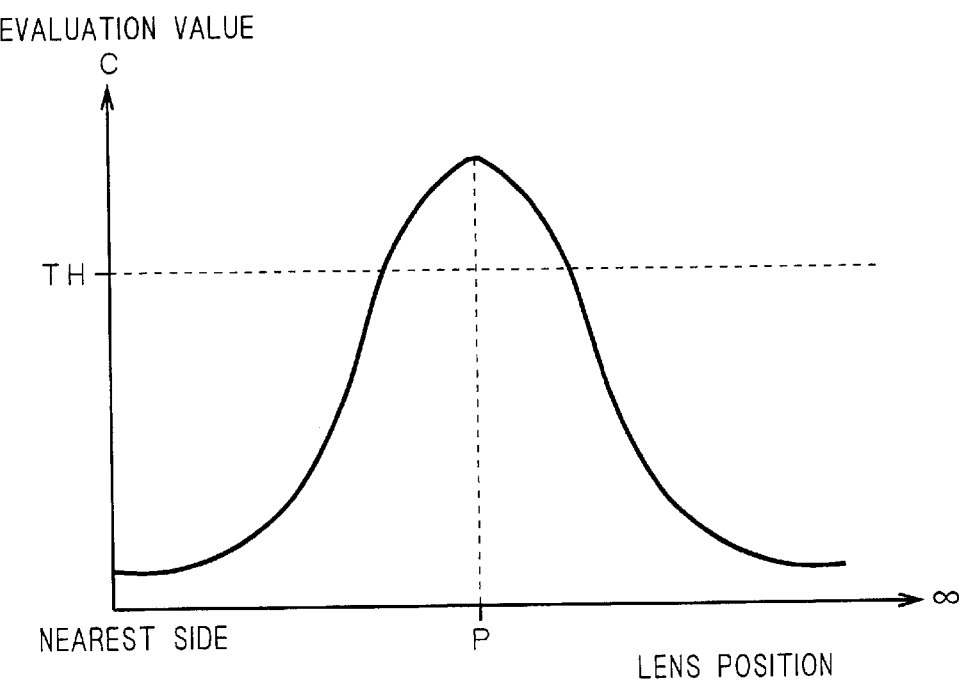
FIG. 7 is a graph showing the relation between the position of an image pick-up lens and the evaluation value.

FIG. 7 is a graph showing the relation between the lens position of the taking lens 301 (more strictly, a focus lens unit included in the taking lens 301) and the evaluation value C computed from an image obtained at the lens position. In the case where the subject is stationary, by moving the lens position of the taking lens 301 from the nearest side to the infinite point, the evaluation value C shows its maxim value in a lens position P as shown in FIG. 7. Since the contrast of an image component included in the evaluation area FR is made maximum in the lens position P, the lens position P is an in-focus position realizing the in-focus state of an image component.

The display image control unit 240 compares the evaluation value C with the threshold TH. If the evaluation value C is equal to or larger than the threshold TH, the display image control unit 240 determines that the image component included in the evaluation area FR is almost in a focus state. If the evaluation value C is less than the threshold TH, the display image control unit 240 determines that the image component included in the evaluation area FR is in an out-of-focus state.

The display image control unit 240 controls the image process in the display image processing unit 250 in accordance with the evaluation result.

At the time of live view display operation, the display image processing unit 250 acquires an image signal stored in the image memory 209 and performs the image process for displaying an image. The image signal subjected to the image process by the display image processing unit 250 is transferred to the display 10 where the image is displayed.

In the embodiment, when it is determined that the image component in the evaluation area FR is out of focus, the display image control unit 240 controls so that an image quality degrading process for emphasizing the out-of-focus state be performed as the image process in the display image processing unit 250.

As a result, when the image component included in the evaluation area FR is out of focus, the display image processing unit 250 performs a predetermined image quality degrading process on the image objected from the image memory 209, outputs the image subjected to the image quality degrading process to the display 10, and displays the image on the display 10.

As described above, the digital camera 1 is constructed so that when an image obtained at the time of live view display operation is out of focus, the image quality degrading process is performed on the image and the image subjected to the image quality degrading process is displayed on the display 10. Consequently, the user can easily recognize whether focus is achieved on the image displayed on the display 10 before image recording.

On the other hand, when the image component included in the evaluation area FR is almost in focus, the display image control unit 240 controls so that the image quality degrading process is not performed as the image process in the display image processing unit 250. At this time, the display image processing unit 250 performs an image process for faithfully reproducing an image obtained from the image memory 209 or a sharpening process.

Therefore, when an image is out of focus, the image is displayed in a state where it is degraded so as not to be easily viewed. In contrast, when an image is almost in focus, a display image faithful to the original image or a sharp display image is displayed. By a gap between the display image in the out-of-focus state and the display image almost in the focus state, the user can easily recognize whether the image is blurred by defocus or not only by viewing the image displayed on the display 10. Particularly, when an image is out of focus, the image is displayed in a state where it is degraded. Thus, the user can instantaneously grasp that the image is blurred by defocus.

Consequently, in the case where the user tries to achieve the in-focus state of an image by a manual operation in the manual-focus mode, the user can appropriately lead the image to an in-focus state while viewing an image displayed on the display 10.

In the case of performing only a sharpening process such as a peaking process on an image when the image is almost in focus, when the image enters an almost in-focus state, the user can recognize that the image is almost in focus. However, when the image is out of focus, it is difficult for the user to recognize that the image is blurred by defocus. Consequently, in the digital camera 1 of the embodiment, when an image is out of focus, the image quality of the whole display image on the display 10 is degraded to let the user recognize that the image is blurred by defocus.

In the conventional digital camera of performing the peaking process, as an image is becoming in focus, the user notices that images before that are out of focus. In contrast, in the digital camera 1 of the embodiment, when the user sees a displayed image in a state, the user can promptly determine whether the image is almost in focus or out of focus.

Concrete examples of the image degrading process executed when an image component included in the evaluation area FR in the digital camera 1 with such a configuration is out of focus are a unsharpening process, a tone lowering process, a luminance lowering process, a mosaic process, a noise adding process and the like. The concrete examples will be described later.

2. Unsharpening Process

First, the configuration and operation of a case where the unsharpening process is performed in the digital camera 1 when an image component included in the evaluation area FR is out of focus will be described.

Figure 8:
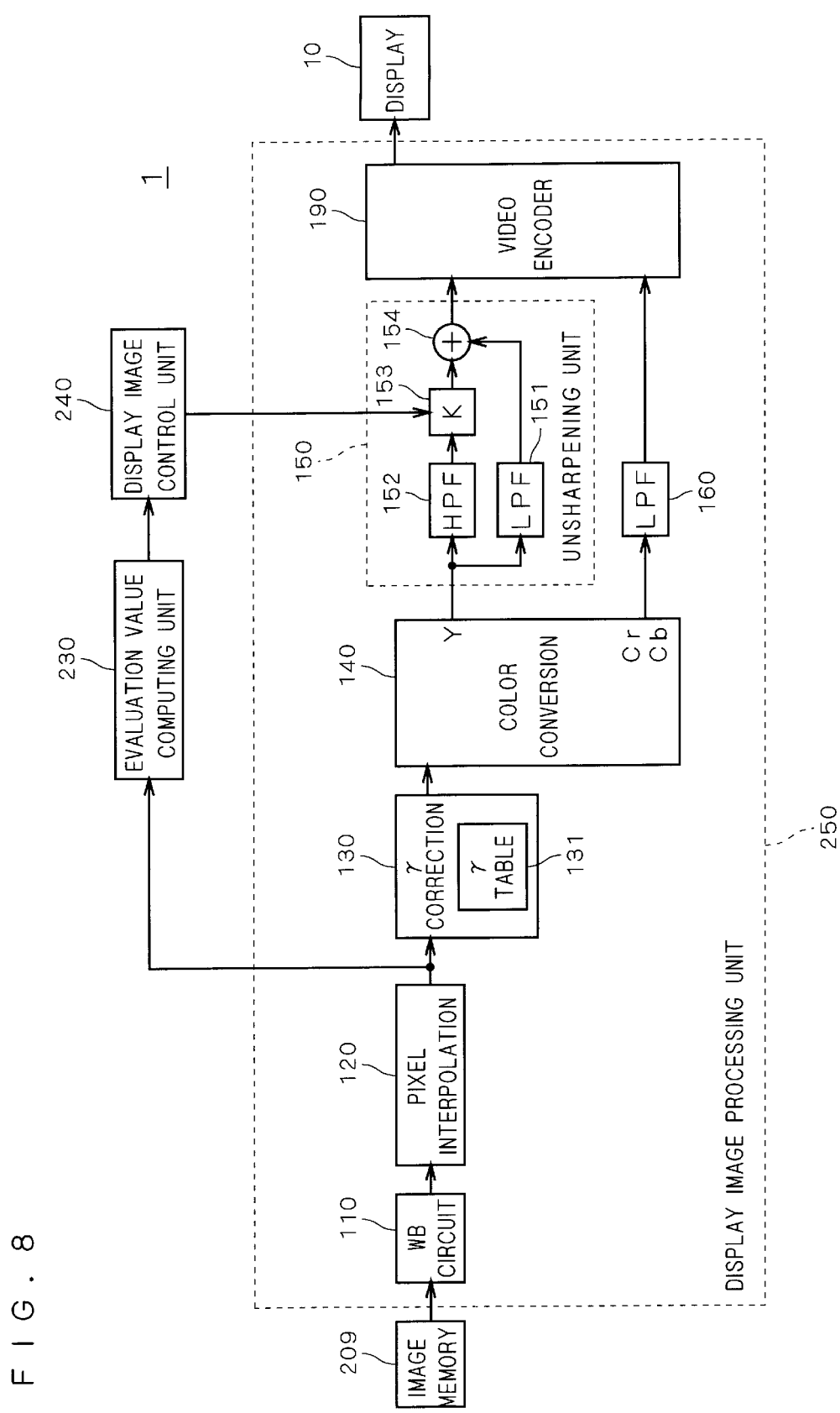
FIG. 8 is a block diagram showing the configuration of the case where a blurring process is performed in the digital camera.

FIG. 8 is a block diagram showing the configuration of a case where the unsharpening process is performed in the digital camera 1. In the digital camera 1, at the time of live view display operation, the display image processing unit 250 obtains an image stored in the image memory 209 and performs a process. Finally, an image signal is outputted to the display 10 and an image is displayed.

As shown in FIG. 8, the display image processing unit 250 is constructed by a WB (White Balance) circuit 110, a pixel interpolating unit 120, a γ correcting unit 130, a color converting unit 140, an unsharpening unit 150, a low pass filter (LPF) 160 and a video encoder 190.

The WB circuit 110 adjusts white balance by receiving the image signal indicative of the color component value according to the Bayer pattern pixel by pixel from the image memory 209 and performing level shifting of the color component value every pixel.

After the white balance is adjusted, the image signal is inputted to the pixel interpolating unit 120 where each pixel is subjected to an interpolating process. Specifically, since each pixel has only information regarding the primary color component of one of R, G and B, an interpolating process of estimating information of the other primary color components on the basis of the values of peripheral pixels is performed. By the interpolating process, information (color component value) of 12 bits regarding three primary color components of R, G and B is given to each pixel.

After the interpolating process is finished, the image signal is inputted to the γ correcting unit 130 and the evaluation value computing unit 230.

The γ correcting unit 130 corrects the image signal having the color component values of R, G and B every pixel on the basis of a γ table 131 in accordance with the reproduction characteristics of the display 10. The γ correcting unit 130 performs conversion of compressing a 12-bit signal to an 8-bit signal on the pixel unit basis at the time of performing the γ correcting process based on the γ table 131. After the γ correcting process is performed, the image signal is inputted to the color converting unit 140.

In the color converting unit 140, a matrix for color conversion is prestored. When the image signal formed by compressing the 12-bit signal to the 8-bit signal pixel is received, the color converting unit 140 performs color converting computation using a matrix, thereby converting an image signal in which color components of each pixel are expressed in the RGB color space into an image signal expressed by a luminance component (Y) and color difference components (Cr and Cb). After the color converting process is performed, the luminance value Y is inputted to the unsharpening unit 150, and the color difference component values Cr and Cb are inputted to the low pass filter 160.

On the other hand, when the image signal is inputted from the pixel interpolating unit 120 to the evaluation value computing unit 230, the evaluation value computing unit 230 extracts all of pixels included in the evaluation area FR. The luminance value Y corresponding to each pixel is obtained from color component values of R, G and B and computation based on Equation 1 is performed, thereby obtaining the evaluation value C. After that, the evaluation value computing unit 230 supplies the calculated evaluation value C to the display image control unit 240.

The display image control unit 240 compares the evaluation value C with the threshold TH and determines a focus state of the image component included in the evaluation area FR. According to the result of determination, the value of a coefficient K applied to the unsharpening unit 150 is controlled. Concretely, when it is determined that an image component included in the evaluation area FR is almost in a focus state, the display image control unit 240 sets the coefficient K to an arbitrary value in the range from not less than 1 to not more than 2. When it is determined that an image component included in the evaluation area FR is out of focus, the display image control unit 240 sets the coefficient K to 0.

The unsharpening unit 150 has a low pass filter (LPF) 151, a high pass filter (HPF) 152, a K multiplier 153 and an adder 154.

As the low pass filter 151, for example, a low pass filter of 3×3 as shown in FIG. 9 is applied and has the function of unsharpening a luminance component inputted from the color converting unit 140. As the high pass filter 152, for example, a high pass filter of 3×3 as shown in FIG. 10 is applied and has the function of emphasizing the high frequency components of the luminance component inputted from the color converting unit 140.

FIG. 11 is a diagram showing the luminance value of the image component to which the filters are applied. As shown in FIG. 11, the low pass filter and high pass filter are applied to an area of 3×3 pixels including a target pixel Yij as a center.

In the low pass filter 151, a filter computation indicated by the following equation is performed and an output signal Lij is obtained.

$$L_{ij} = \frac{1}{16}\{(Y_{i-1,j-1} + Y_{i-1,j+1} + Y_{i+1,j-1} + Y_{i+1,j+1}) + 2(Y_{i-1,j} + Y_{i,j-1} + Y_{i,j+1} + Y_{i+1,j}) + 4Y_{i,j}\} \quad \text{Equation 2}$$

The high pass filter 152 performs the filtering operation expressed by the following equation and an output signal Hij is obtained.

$$H_{ij} = -\frac{1}{16}\{(Y_{i-1,j-1} + Y_{i-1,j+1} + Y_{i+1,j-1} + Y_{i+1,j+1}) + 2(Y_{i-1,j} + Y_{i,j-1} + Y_{i,j+1} + Y_{i+1,j}) - 12Y_{i,j}\} \quad \text{Equation 3}$$

The output signal Lij outputted from the low pass filter 151 is supplied as it is to the adder 154 whereas the output signal Hij outputted from the high pass filter 152 is multiplied by K times by the K multiplier 153 and the resultant signal is supplied to the adder 154. In the adder 154, the output signals Lij and K·Hij are subjected to adding operation, and a display luminance value Y'ij of the target pixel is outputted.

That is, the display luminance value Y'ij is a value expressed by the following equation.

$$Y'_{ij} = L_{ij} + K \cdot H_{ij} \quad \text{Equation 4}$$

As described above, when it is determined that the image component included in the evaluation area FR is almost in focus, the display image control unit 240 sets the coefficient K to an arbitrary value in the range from not less than 1 to not more than 2. When it is determined that the image component included in the evaluation area FR is out of focus, the display image control unit 240 sets the coefficient K to 0.

Therefore, when the image component included in the evaluation area FR is out of focus, a display luminance value Y' outputted from the unsharpening unit 150 is expressed as Y'ij=Lij and becomes a unsharpened signal by the low pass filter 151.

When the image component included in the evaluation area FR is almost in focus, the display luminance value Y' outputted from the unsharpening unit 150 is expressed as Y'ij=Lij+K·Hij. When K=1, Y'ij=Yij is satisfied, and the luminance value Y outputted from the color converting unit 140 is used as it is as the display luminance value. When 1<K≦2, the display luminance value Y' becomes a value at which the degree of sharpness is higher than the luminance value Y.

After the unsharpening process is performed on the luminance component, a display luminance value as a resultant output is inputted to the video encoder 190.

The color difference component values Cr and Cb outputted from the color converting unit 140 are also subjected to a predetermined filtering process in the low pass filter 160 and, after that, the resultant values are inputted to the video encoder 190.

In the video encoder 190, on the basis of the input display luminance value Y' and color difference component values Cr and Cb, an image signal (video signal) of the NTSC (National Television System Committee) system, the PAL (Phase Alternation by Line) system or the like is generated and outputted to the display 10.

As a result, when the image component included in the evaluation area FR is blurred by defocus, an image is displayed on the display 10 in a state where the degree of blur is increased. When the image component included in the evaluation area FR is almost in focus, a sharp image is displayed on the display 10. Therefore, in the case where the user takes a picture of an image of the subject by using the digital camera 1, the user can easily determine whether the image is in focus or not only by viewing the image displayed on the display 10.

By displaying an image obtained by making the image further blurred, the user can recognize that the image is blurred by defocus even in the display 10 having the smaller number of display pixels. Consequently, the user does not erroneously recognize that the image which is actually blurred by defocus is almost in focus, so that the recording can be prevented in out of focus condition.

3. Tone Lowering Process

The configuration and operation of a case where a tone lowering process is executed in the digital camera 1 when an image component included in the evaluation area FR is out of focus will now be described.

Figure 12:
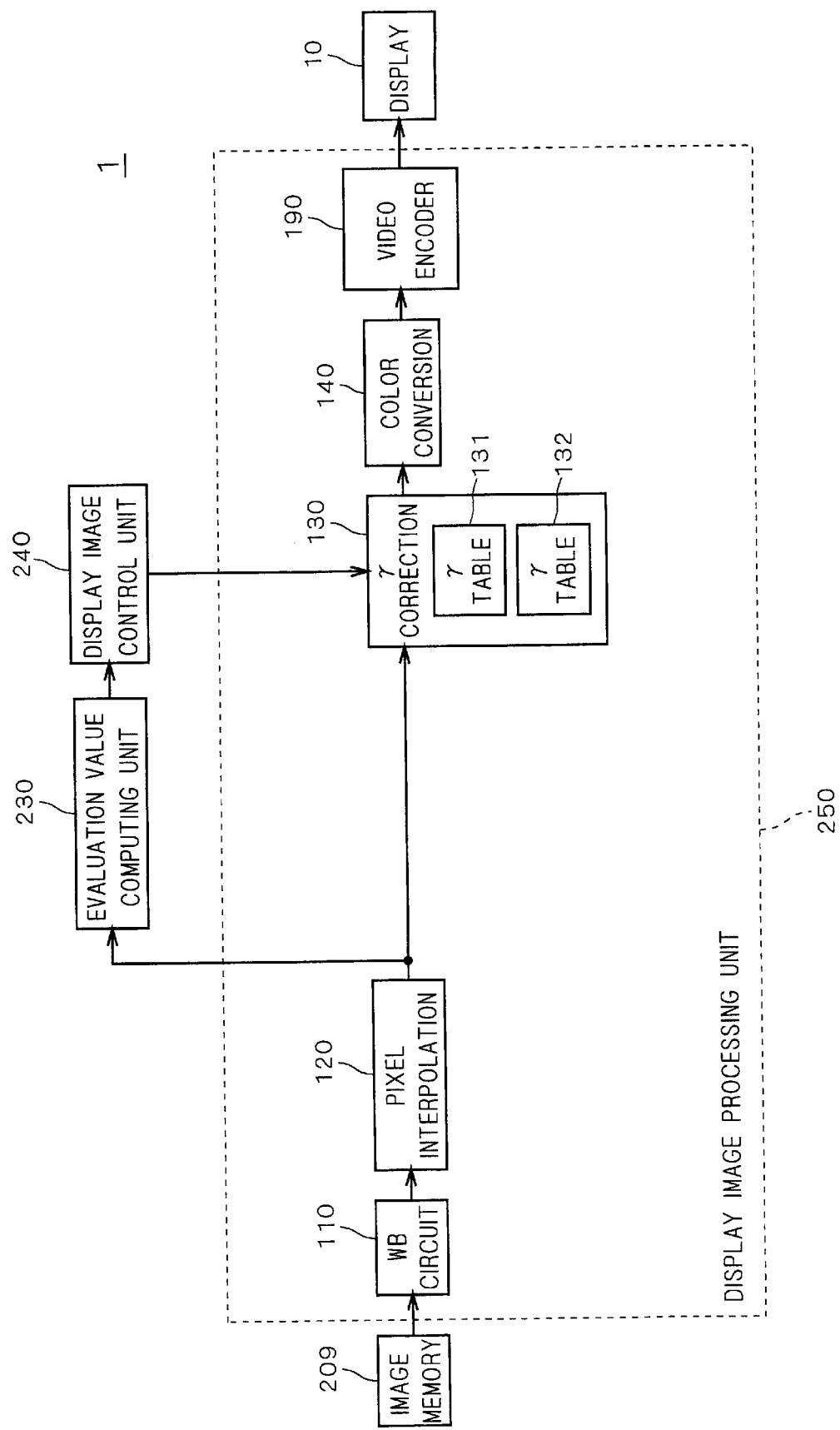
FIG. 12 is a block diagram showing the configuration of a case where a tone lowering process (or luminance lowering process) is executed in the digital camera.

FIG. 12 is a block diagram showing the configuration of a case where the tone lowering process (or luminance lowering process) is executed in the digital camera 1. In the digital camera 1, at the time of live view display operation, an image stored in the image memory 209 is obtained by the display image processing unit 250 in which an image process is performed on the image. Finally, the image signal is outputted to and displayed on the display 10.

As shown in FIG. 12, the display image processing unit 250 has the pixel interpolating unit 120, γ correcting unit 130, color converting unit 140 and video encoder 190.

The WB circuit 110, pixel interpolating unit 120, color converting unit 140 and video encoder 190 are similar to those in the above description. The evaluation value computing unit 230 is also similar to the above, extracts an image component in an evaluation area from an image signal subjected to the interpolating process, calculates an evaluation value C, and supplies the evaluation value C to the display image control unit 240.

The display image control unit 240 compares the evaluation value C with the threshold TH and determines a focus state of the image component included in the evaluation area FR. According to the result of determination, a γ table applied to the γ correcting unit 130 is controlled in accordance with the determination result. Concretely, when it is determined that the image component included in the evaluation area FR is almost in focus, the display image control unit 240 sets the normal γ table in the γ correcting unit 130 and controls so as to output an 8-bit image signal expressing 256 tones (levels) from the γ correcting unit 130.

On the other hand, when it is determined that an image component included in the evaluation area FR is out of focus, the display image control unit 240 sets a γ table which makes the tone value decrease in the γ correcting unit 130 and controls so as to output, for example, an 8-bit image signal expressing 32 tones (levels) from the γ correcting unit 130.

In the γ correcting unit 130, a plurality of γ tables 131 and 132 are prestored. The display image control unit 240 instructs the γ correcting unit 130 to perform the γ correcting process while designating one of the γ tables in accordance with the evaluation value C.

Figure 13:
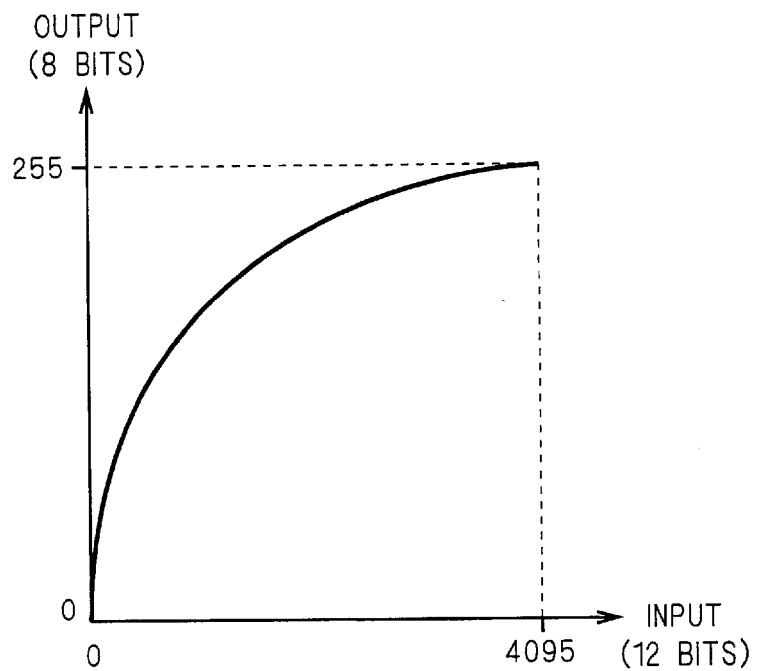
FIG. 13 is a graph showing a normal γ table.
Figure 14:
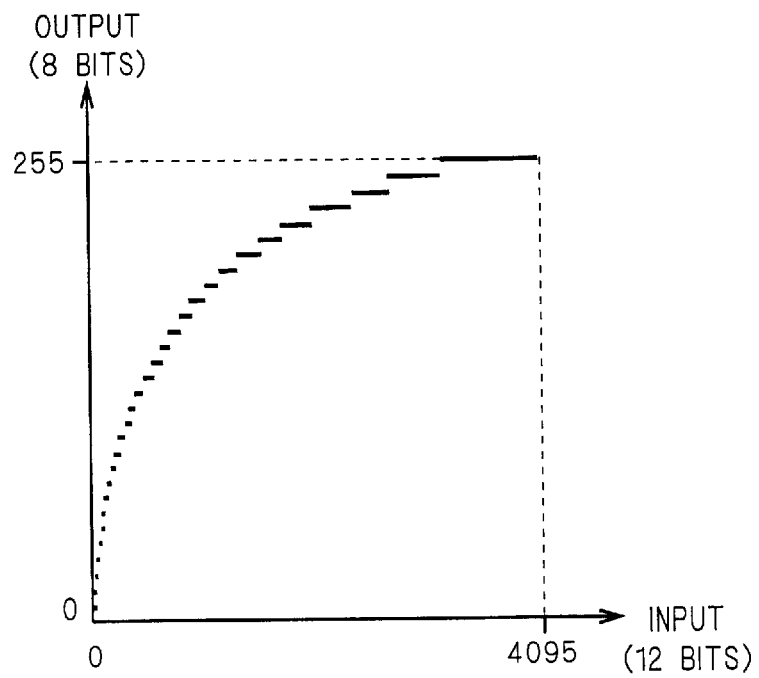
FIG. 14 is a graph showing a γ table for lowering the tone.

FIG. 13 is a graph showing the normal γ table 131 and FIG. 14 is a graph showing the γ table 132 for lowering the tone.

First, when it is determined that the image component included in the evaluation area FR is almost in focus, the display image control unit 240 sets the γ table 131 in the γ correcting unit 130 and controls so that an 8-bit image signal expressing 256 tones is outputted as shown in FIG. 13.

When it is determined that the image component included in the evaluation area FR is out of focus, the display image control unit 240 sets the γ table 132 in the γ correcting unit 130 and controls so that an 8-bit image signal with lowered tone is outputted as shown in FIG. 14.

In the case where it is constructed that a plurality of γ tables are not prestored in the γ correcting unit 130 but a γ correcting process is performed by always using the normal γ table 131, when an image component included in the evaluation area FR is determined to be out of focus, the lower three bits of the 8-bit output is set to "0" and the resultant signal is outputted. In such a manner as well, effects similar to the above can be obtained. In this case, only the upper five bits effectively show tones, so that 32 tones are expressed by the 8-bit output.

Therefore, from the γ correcting unit 130, when an image is almost in focus, the image signal of 256 tones is outputted. In contrast, when an image is out of focus, an image signal of a tone (for example, an image signal of 32 tones) lower than that in the focus state is outputted.

After the γ correcting process is performed, the image signal is inputted to the color converting unit 140 where the image signal is converted into an image signal expressed by the luminance component (Y) and color difference components (Cr and Cb). The resultant signal is inputted to the video encoder 190. On the basis of the input luminance value Y and color difference component values Cr and Cb, the video encoder 190 generates the image signal (video signal) of the NTSC system, PAL system or the like and outputs it to the display 10.

When the image component included in the evaluation area FR is out of focus as a result, the image expressed in tones of the smaller number is displayed on the display 10. When the image component included in the evaluation area FR is almost in focus, an image expressed by 8-bit full tones is displayed on the display 10. Specifically, an image displayed in the out-of-focus state is an image whose image quality is remarkably lowered as compared with an image displayed in an almost in-focus state. Consequently, in the case of capturing an image of a subject by using the digital camera 1, the user can easily determine whether or not the image is in focus only by viewing the image displayed on the display 10.

Consequently, the user can visually recognize that the image is blurred by defocus even on the display 10 of the small number of display pixels. Thus, the user does not erroneously recognize that the blurred image by defocus is almost in focus, and the recording can be prevented in out of focus condition.

4. Luminance Lowering Process

The configuration and operation of a case where the luminance lowering process is executed in the digital camera 1 in a state where an image component included in the evaluation area FR is out of focus will now be described.

In this case as well, as the configuration of the digital camera 1, a configuration similar to that shown in FIG. 12 can be applied.

The display image control unit 240 compares the evaluation value C obtained from the evaluation value computing unit 230 with the threshold TH, determines the focus state of the image component included in the evaluation area FR and, according to the result of determination, controls a γ table applied in the γ correcting unit 130.

Concretely, when it is determined that the image component included in the evaluation area FR is almost in focus, the display image control unit 240 sets a normal γ table to the γ correcting unit 130 and controls so that an 8-bit image signal whose maximum luminance value is 255 is outputted from the γ correcting unit 130.

On the other hand, when it is determined that the image component included in the evaluation area FR is out of focus, the display image control unit 240 sets a γ table which makes the luminance value decrease in the γ correcting unit 130 and controls so that an 8-bit image signal whose maximum luminance value is expressed by, for example, 255×A (where A is an arbitrary value satisfying the relation of 0<A<1) is outputted.

In the γ correcting unit 130, the plurality of γ tables 131 and 132 are prestored. The display image control unit 240 instructs the γ correcting unit 130 to perform the γ correcting process while designating one of the γ tables in accordance with the evaluation value C.

The normal γ table 131 is similar to that of FIG. 13. FIG. 15 is a graph showing the γ table 132 for lowering the luminance value.

First, when it is determined that the image component included in the evaluation area FR is almost in focus, the display image control unit 240 sets the γ table 131 in the γ correcting unit 130 and controls so that an 8-bit image signal whose maximum luminance value is 255 is outputted as shown in FIG. 13.

When it is determined that the image component included in the evaluation on area FR is out of focus, the display image control unit 240 sets the γ table 132 the γ correcting unit 130 and controls so that an 8-bit image signal whose maximum luminance value is 255×A is outputted as shown in FIG. 14. Although the case where A=0.8 is shown in FIG. 15, the present invention is not limited to the case.

Therefore, from the γ correcting unit 130, when an image is almost in focus, an image signal maintaining brightness of the original image stored in the image memory 209 is outputted. In contrast, when an image is out of focus, a relatively dark image signal obtained by decreasing brightness of the original image is outputted.

After the γ correcting process is performed, the image signal is inputted to the color converting unit 140 where the image signal is converted into an image signal expressed by the luminance component (Y) and color difference components (Cr and Cb). The resultant signal is inputted to the video encoder 190. On the basis of the input luminance value Y and color difference component values Cr and Cb, the video encoder 190 generates the image signal (video signal) of the NTSC system, PAL system or the like and outputs it to the display 10.

When the image component included in the evaluation area FR is out of focus as a result, a dark image is displayed on the display 10. When the image component included in the evaluation area FR is almost in focus, a light image is displayed on the display 10. That is, an image displayed in the out-of-focus state is an image whose brightness is remarkably lowered as compared with an image displayed in an almost focus state. Consequently, in the case where the user takes a picture of an image of a subject by using the digital camera 1, the user can easily determine whether or not the image is in focus only by viewing the image displayed on the display 10.

Consequently, the user can visually recognize that the image is blurred by defocus even on the display 10 of the small number of display pixels. Thus, the user does not erroneously recognize that the blurred image by defocus is almost in focus, and the recording can be prevented in out of focus condition.

5. Mosaic Process

The configuration and operation of a case where a mosaic process is executed in the digital camera 1 when an image component included in the evaluation area FR is out of focus will now be described. The mosaic process is a process of dividing an image into a plurality of blocks and setting the values of all of pixels included in the same block to the same data.

Figure 16:
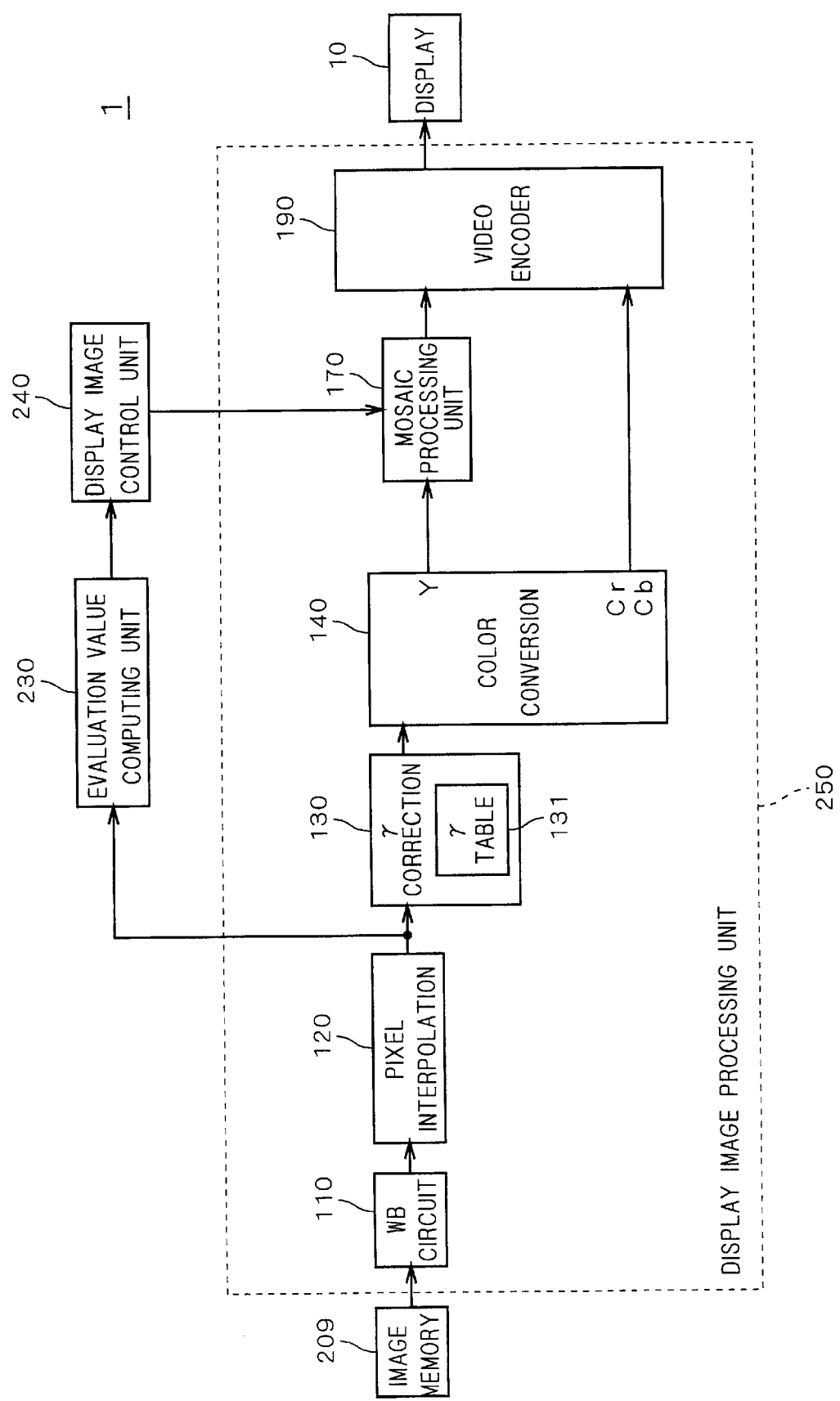
FIG. 16 is a block diagram showing the configuration of a case where a mosaic process is executed in the digital camera.

FIG. 16 is a block diagram showing the configuration of a case where the mosaic process is executed in the digital camera 1. In the digital camera 1, at the time of live view display operation, an image stored in the image memory 209 is obtained by the display image processing unit 250 in which an image process is performed on the image. Finally, the image signal is outputted to and displayed on the display 10.

As shown in FIG. 16, the display image processing unit 250 has the WB circuit 110, pixel interpolating unit 120, γ correcting unit 130, color converting unit 140, a mosaic processing unit 170 and video encoder 190.

The WB circuit 110, pixel interpolating unit 120, color converting unit 140, and video encoder 190 are similar to those in the above description. The evaluation value computing unit 230 is similar to the above, extracts an image component in an evaluation area from an image signal subjected to the interpolating process, calculates the evaluation value C, and supplies it to the display image control unit 240.

The display image control unit 240 compares the evaluation value C with the threshold TH and determines a focus state of the image component included in the evaluation area FR. According to the result of determination, the display image control unit 240 controls the on/off state of the mosaic processing function in the mosaic processing unit 170. Concretely, when it is determined that the image component included in the evaluation area FR is almost in focus, the display image control unit 240 turns off the mosaic processing function in the mosaic processing unit 170 controls so that no process is performed in the mosaic processing unit 170.

On the other hand, when it is determined that the image component included in the evaluation area FR is out of focus, the display image control unit 240 turns on the mosaic processing function in the mosaic processing unit 170, and controls so that the mosaic processing unit 170 performs the mosaic process on the image signal constructed by the luminance component inputted from the color converting unit 140.

FIGS. 17A and 17B are diagrams showing the concept of the mosaic process. For example, it is assumed that an image G1 constructed by luminance components inputted from the mosaic processing unit 170 is as shown in FIG. 17A. The mosaic processing unit 170 divides the image G1 of FIG. 17A consisting of the number of display pixels of 400×300 into blocks each consisting of four pixels of 2×2. As a result, 200×150 blocks are generated from the image G1.

The mosaic processing unit 170 determines a representative value for setting the same value to all of the pixel values included in the same block on the block unit basis. A method of determining a representative value includes, for example, a method of using the luminance value of a pixel existing in a specific position in a block as the representative value and a method of calculating an average luminance value in a block and using it as a representative value. After the representative value is determined with respect to a block, the representative value is set to all of pixels included in the block.

As a result, a mosaic image G2 as shown in FIG. 17B is generated. The mosaic image G2 of FIG. 17B illustrates a case where the luminance value of the upper left pixel of each block is set as a representative value.

Therefore, when the mosaic processing unit 170 is instructed by the display image control unit 240 to make the mosaic processing function, the mosaic processing unit 170 generates and outputs the mosaic image G2 as shown in FIG. 17B from the input image G1 as shown in FIG. 17A. When an instruction of not to make the mosaic processing function is given from the display image control unit 240, the mosaic processing unit 170 outputs the input image G1 as shown in FIG. 17A as it is.

That is, when an image is almost in focus, an image signal obtained from the color converting unit 140 is outputted from the mosaic processing unit 170 as it is. On the other hand, when an image is out of focus, the mosaic process for degrading the image quality is performed on the image signal obtained from the color converting unit 140 and the mosaic image G2 is outputted.

An image signal outputted from the mosaic processing unit 170 is inputted to the video encoder 190. On the basis of the inputted luminance value Y and color difference component values Cr and Cb, the video encoder 190 generates the image signal (video signal) of the NTSC system, PAL system or the like and outputs it to the display 10.

When the image component included in the evaluation area FR is blurred by defocus as a result, a mosaic image is displayed on the display 10. When the image component included in the evaluation area FR is almost in focus, a high-precision image is displayed on the display 10. That is, an image displayed in the out-of-focus state is an image whose picture quality is remarkably degraded as compared with an image displayed in an almost focus state. Consequently, in the case where the user takes a picture of an image of a subject by using the digital camera 1, the user can easily determine whether or not the image is in focus only by viewing the image displayed on the display 10.

Consequently, the user can visually recognize that the image is blurred by defocus even on the display 10 of the small number of display pixels. Thus, the user does not erroneously recognize that the blurred image by defocus is almost in focus, and the recording can be prevented in out of focus condition.

In the embodiment of the mosaic process, the case of performing the color converting process by the color converting unit 140 and, after that, performing the mosaic process has been described. It is also possible to mount the mosaic processing unit 170 at the output terminal side of the γ correcting unit 130 and perform the mosaic process on an RGB image.

6. Noise Adding Process

The configuration and operation of a case where a noise adding process is executed in the digital camera 1 when an image component included in the evaluation area FR is out of focus will now be described.

Figure 18:
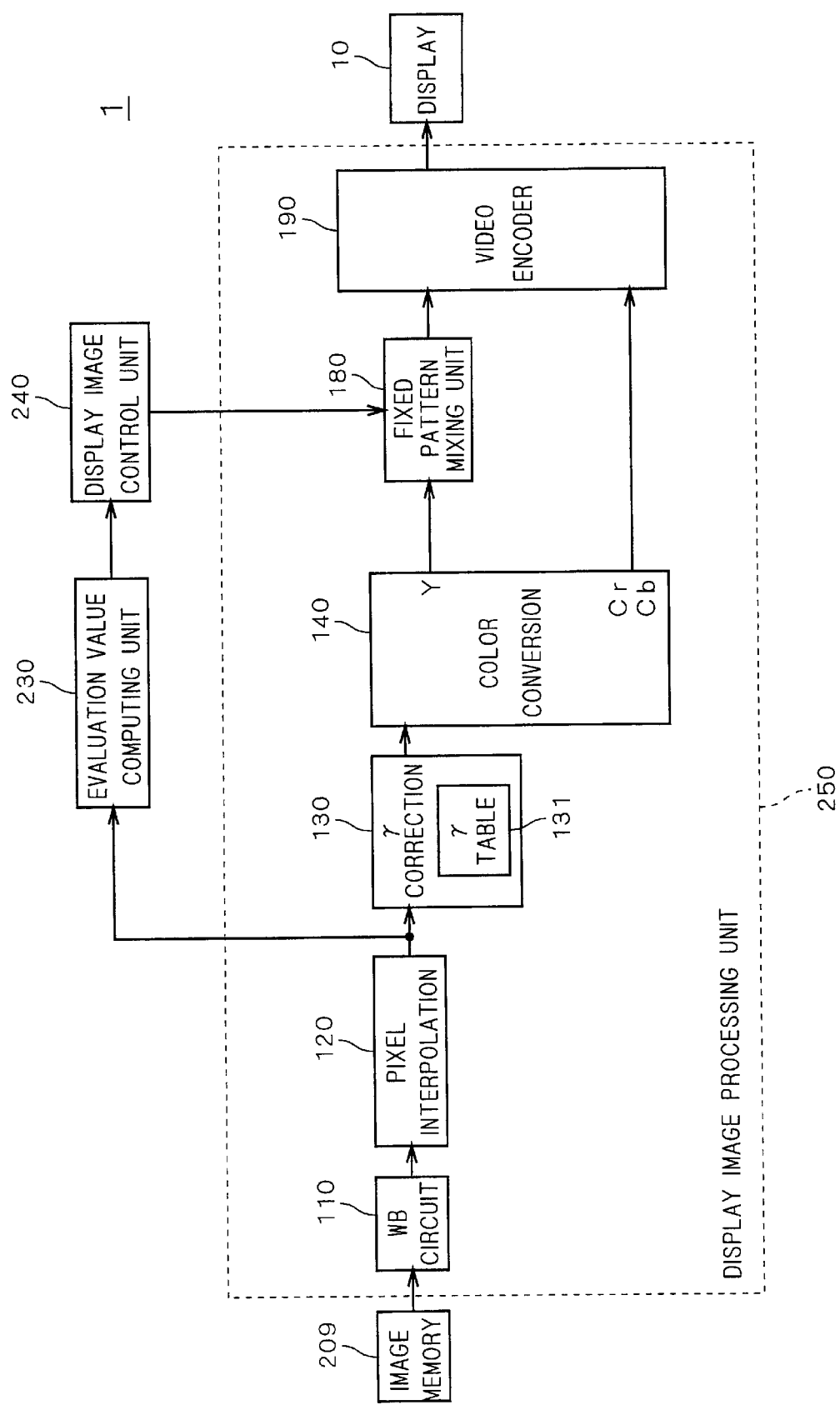
FIG. 18 is a block diagram showing the configuration of a case where a noise adding process is performed in the digital camera.

FIG. 18 is a block diagram showing the configuration of a case where the noise adding process is executed in the digital camera 1. In the digital camera 1, at the time of live view display operation, an image stored in the image memory 209 is obtained by the display image processing unit 250 in which an image process is performed on the image. Finally, the image signal is outputted to and displayed on the display 10.

As shown in FIG. 18, the display image processing unit 250 has the WB circuit 110, pixel interpolating unit 120, γ correcting unit 130, color converting unit 140, a fixed pattern mixing unit 180 and video encoder 190.

The WB circuit 110, pixel interpolating unit 120, color converting unit 140 and video encoder 190 are similar to those in the above description. The evaluation value computing unit 230 is similar to the above, extracts an image component in an evaluation area from an image signal subjected to the interpolating process, calculates the evaluation value C, and supplies it to the display image control unit 240.

The display image control unit 240 compares the evaluation value C with the threshold TH and determines a focus state of the image component included in the evaluation area FR. According to the result of determination, the display image control unit 240 controls the on/off state of a fixed pattern mixing function (noise adding function) in the fixed pattern mixing unit 180. Concretely, when it is determined that the image component included in the evaluation area FR is almost in focus, the display image control unit 240 turns off the fixed pattern mixing function in the fixed pattern mixing unit 180 and controls so that no process is performed in the fixed pattern mixing unit 180.

On the other hand, when it is determined that the image component included in the evaluation area FR is out of focus, the display image control unit 240 turns on the fixed pattern mixing process in the fixed pattern mixing unit 180, and controls so that the fixed pattern mixing unit 180 performs the fixed pattern mixing process (noise adding process) on the image signal constructed by the luminance component inputted from the color converting unit 140.

When turned on by the display image control unit 240, the fixed pattern mixing unit 180 performs a process of mixing a luminance component inputted from the color converting unit 140 with a predetermined solid color pattern (noise component) every pixel. Consequently, an image outputted from the fixed pattern mixing unit 180 is a foggy, unclear image as compared with the image outputted from the color converting unit 140.

That is, when an image is almost in focus, an image signal obtained from the color converting unit 140 is outputted as it is from the mosaic processing unit 170. On the other hand, when an image is out of focus, an unclear image obtained by adding noise for degrading the picture quality to an image signal obtained from the color converting unit 140 is outputted.

An image signal outputted from the fixed pattern mixing unit 180 is inputted to the video encoder 190. On the basis of the inputted luminance value Y and color difference component values Cr and Cb, the video encoder 190 generates the image signal (video signal) of the NTSC system, PAL system or the like and outputs it to the display 10.

When the image component included in the evaluation area FR is blurred by defocus as a result, a foggy, unclear image is displayed on the display 10. When the image component included in the evaluation area FR is almost in focus, a clear image is displayed on the display 10. That is, an image displayed in the out-of-focus state is an unclear image whose picture quality is remarkably degraded as compared with an image displayed in an almost focus state. Consequently, in the case where the user takes a picture of an image of a subject by using the digital camera 1, the user can easily determine whether or not the image is in focus only by viewing the image displayed on the display 10.

Consequently, the user can visually recognize that the image is blurred by defocus even on the display 10 of the small number of display pixels. Thus, the user does not erroneously recognize that the blurred image by defocus is almost in focus, and the recording can be prevented in out of focus condition.

In the embodiment of the noise adding process, the case of performing the color converting process by the color converting unit 140 and, after that, performing the fixed pattern mixing process (noise adding process) has been described. However, it is also possible to mount the fixed pattern mixing unit 180 at the output terminal side of the γ correcting unit 130 and perform the fixed pattern mixing process on an RGB image.

7. Embodiment of System Configuration

In recent years, an image capturing system in which a digital camera and a computer are connected to each other and the computer performs an image capturing control of the digital camera has been also being realized.

Examples of changing the display state of a display image in accordance with a focus state of the image at the time of displaying live view in the digital camera 1 have been described above. The above-described techniques can be also applied to the image capturing system in which a digital camera and a computer are connected to each other. An embodiment of the image capturing system will now be described.

Figure 19:
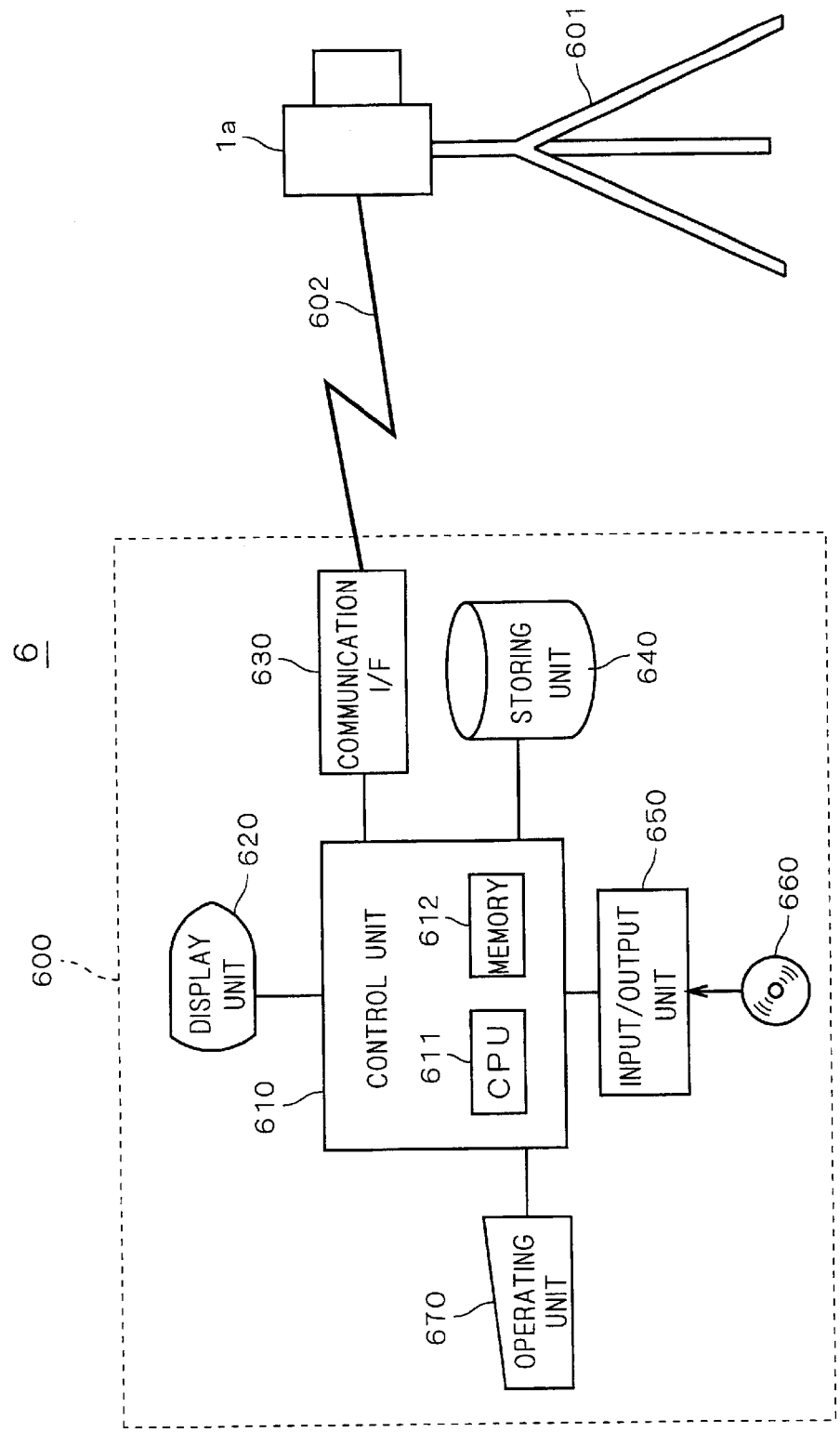
FIG. 19 is a diagram showing the configuration of an image capturing system.

FIG. 19 is a diagram showing the configuration of an image capturing system 6. As shown in FIG. 6, the image capturing system 6 has a configuration such that a computer 600 and a digital camera 1*a* are connected to each other so that data can be transferred to each other via a wireless or wired communication medium 602.

The computer 600 includes: a control unit 610 constructed by a CPU 611 and a memory 612; a display unit 620 taking the form of a liquid crystal display, a CRT display or the like; an operating unit 670 including a keyboard and a mouse used by the user to perform operation; a storing unit 640 for storing data; a communication interface (I/F) 630 for performing data communication with the digital camera 1*a*; and an input/output unit 650 for reading/writing data from/to a recording medium 660.

In the recording medium 660, a program for making the computer 600 realize functions (see FIG. 3) similar to those of the camera body 2 of the digital camera 1 is stored.

The digital camera 1*a* is fixed by a fixture 601 such as a tripod in a predetermined image capturing position. The digital camera 1*a* has a configuration similar to that of the digital camera shown in FIG. 3 and operates the taking lens 301 and the image capturing function units 302, 303, 313, 314, 315 and M1 to M3 in accordance with a control signal inputted from the computer 600.

In the image capturing system 6 with such a configuration, the computer 600 reads the program via the input/output unit 650 and executes it, thereby realizing functions similar to those of the overall control unit 211 of the digital camera 1.

When the computer 600 controls the digital camera 1*a* to perform remote image capturing, live view display is performed in the computer 600. The user operates the operating unit 670 to perform focusing control of the digital camera 1*a* while visually recognizing an image displayed on the computer 600.

When the image capturing system 6 performs the focusing control by manual operation of the user via the operating unit 670, as described in the embodiments, the computer 600 evaluates the focus state of an image inputted from the digital camera 1*a*. When the evaluation result is out-of-focus, the image quality degrading process is performed on the image displayed on the display unit 620.

As result, even in the case of performing remote image capturing in the image capturing system 6, the user can easily recognize the focus state in the digital camera 1*a* on the basis of the image displayed on the computer 600.

8. Modifications

Although the embodiments of the present invention have been described above, the present invention is not limited to the foregoing embodiments.

The embodiments of determining whether an image is in focus or out of focus by using a threshold as a reference and switching the image process in accordance with the state have been described above. It is also possible to perform the image process while changing the degree of degrading the image quality in accordance with the evaluation value at the time of performing a focus evaluation. The image process may be switched not necessarily at two levels but may be three or more levels or switched variably.

Obviously, the digital camera is not limited to a digital still camera but may be a digital video camera.

While the invention has been shown and described in detail, the foregoing description is in all aspects illustrative and not restrictive. It is therefore understood that numerous modifications and variations can be devised without departing from the scope of the invention.

What is claimed is:

1. A digital camera comprising:

an image capturing device for capturing an image;

an evaluating part for evaluating a focus state of a partial area of the image captured by said image capturing device prior to activation of a switch instructing a recording of the image obtained by the image capturing device into a recording medium, the partial area of image being less than the area of the entire image captured by said image capturing device;

an image processor, when said evaluating part determines that the partial area of the image is out of focus, for performing an image quality degrading process for emphasizing the entire image captured by said image capturing device as out of focus; and a display for displaying the entire image subjected to said image quality degrading process in said image processor, wherein when said evaluating part determines that the partial area of the image is out of focus, the entire image displayed on the display is displayed as out of focus.

2. The digital camera according to claim 1, wherein said image quality degrading process is a process of unsharpening the image obtained from said image capturing device.

3. The digital camera according to claim 1, wherein said image quality degrading process is a process of lowering luminance of the image obtained from said image capturing device.

4. The digital camera according to claim 1, wherein said image quality degrading process is a mosaicking process performed on the image obtained from said image capturing device.

5. The digital camera according to claim 1, wherein said image quality degrading process is a process of adding a predetermined noise component to the image obtained from said image capturing device.

6. The digital camera according to claim 1, wherein said image quality degrading process is a process of lowering tone of the image obtained from said image capturing device.

7. The digital camera according to claim 2, wherein said partial area can be set in an arbitrary area in the image obtained by said image capturing device.

8. The digital camera according to claim 3, wherein said partial area can be set in an arbitrary area in the image obtained by said image capturing device.

9. The digital camera according to claim 4, wherein said partial area can be set in an arbitrary area in the image obtained by said image capturing device.

10. The digital camera according to claim 5, wherein said partial area can be set in an arbitrary area in the image obtained by said image capturing device.

11. The digital camera according to claim 6, wherein said partial area can be set in an arbitrary area in the image obtained by said image capturing device.

12. A image capturing system in which a digital camera and a computer are connected to each other and said computer controls said digital camera to capture an image, wherein said digital camera has an image capturing device for capturing the image under control of said computer, and said computer includes:

a evaluating part for evaluating a focus state of a partial area of the image captured by said digital camera prior to activation of a switch instructing a recording of the image captured by the digital camera into a recording medium, the partial area of the image being less than the entire area of the image captured by said digital camera;

an image processor, when said evaluating part determines that the partial area of the image is out of focus, for performing an image quality degrading process for emphasizing the entire image-captured by said digital camera as out of focus; and a display for displaying the entire image subjected to said image quality degrading process in said image processor, wherein when said evaluating part determines that the partial area of the image is out of focus, the entire image displayed on the display is displayed as out of focus.

13. A software program which can be executed by a compute connected to a digital camera and, when executed by said computer, makes said computer function as:

a evaluating part for evaluating a focus state of a partial area of an image obtained by said digital camera prior to activation of a switch instructing a recording of the image obtained by the digital camera into a recording medium, the partial area of the image being less than the area of the entire image obtained by said digital camera;

an image processor, when said evaluating part determines that the partial area of the image is out of focus, for performing an image quality degrading process for emphasizing the entire image obtained by said digital camera as out of focus; and a display for displaying the entire image subjected to said image quality degrading process in said image processor, wherein when said evaluating part determines that the partial area of the image is out of focus, the entire image displayed on the display is displayed as out of focus.

* * * * *